US012615278B2

(12) United States Patent　　　(10) Patent No.:　US 12,615,278 B2
Luttwak et al.　　　　　　　　　(45) Date of Patent:　　Apr. 28, 2026

(54) TECHNIQUES FOR FORENSIC TRACING OF SUSPICIOUS ACTIVITY FROM CLOUD COMPUTING LOGS

(71) Applicant: Wiz, Inc., New York, NY (US)

(72) Inventors: Ami Luttwak, Binyamina (IL); Yinon Costica, Tel Aviv (IL); Roy Reznik, Tel Aviv (IL); George Pisha, Giv'atayim (IL); Liran Moysi, Kfar Saba (IL); Alon Schindel, Tel Aviv (IL)

(73) Assignee: Wiz, Inc., New York, NY (US)

( * ) Notice: Subject to any disclaimer, the term of this patent is extended or adjusted under 35 U.S.C. 154(b) by 242 days.

(21) Appl. No.: 18/060,759

(22) Filed: Dec. 1, 2022

(65) Prior Publication Data

US 2023/0247042 A1　　Aug. 3, 2023

Related U.S. Application Data

(60) Provisional application No. 63/267,365, filed on Jan. 31, 2022.

(51) Int. Cl.
| | |
|---|---|
| *H04L 9/40* | (2022.01) |
| *G06F 16/901* | (2019.01) |
| *G06F 21/55* | (2013.01) |

(52) U.S. Cl.
CPC ...... *H04L 63/1433* (2013.01); *G06F 16/9024* (2019.01); *G06F 21/552* (2013.01); *H04L 63/102* (2013.01); *H04L 63/1416* (2013.01); *H04L 63/1425* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 8,312,023 | B2 | 11/2012 | Shields et al. |
| 9,507,936 | B2 | 11/2016 | Hoog |
| 9,621,597 | B2 | 4/2017 | Frecks, Jr. et al. |
| 9,672,355 | B2 | 6/2017 | Titonis et al. |
| 10,108,803 | B2 * | 10/2018 | Chari ................... G06F 21/577 |

(Continued)

OTHER PUBLICATIONS

Extended European Search Report for EP 23746587.7 dated Jul. 23, 2025. European Patent Office, Munich, Germany.

*Primary Examiner* — Philip J Chea
*Assistant Examiner* — Bin Qing Zheng
(74) *Attorney, Agent, or Firm* — M&B IP Analysts, LLC

(57) ABSTRACT

A system and method traces suspicious activity to a workload based on a forensic log. The method includes detecting in at least one cloud log of a cloud computing environment a plurality of events, each event indicating an action in the cloud computing environment; extracting from an event of the plurality of events an identifier of a cloud entity, wherein the event includes an action which is predetermined as indicative of a suspicious event; traversing a security graph to detect a node representing the cloud entity, wherein the security graph further includes a representation of the cloud computing environment; detecting that the node representing the cloud entity is connected to a node representing a cybersecurity vulnerability; and initiating a mitigation action for the cloud entity based on the cybersecurity vulnerability.

18 Claims, 8 Drawing Sheets

(56)         References Cited

U.S. PATENT DOCUMENTS

| | | | |
|---|---|---|---|
| 10,169,071 B2 | 1/2019 | Cochran | |
| 10,476,759 B2 | 11/2019 | Rahaman | |
| 11,057,414 B1 | 7/2021 | Giorgio et al. | |
| 11,297,073 B2 | 4/2022 | Ladnai et al. | |
| 11,637,844 B2 | 4/2023 | Shenoy et al. | |
| 2014/0317681 A1 | 10/2014 | Shende | |
| 2015/0172321 A1* | 6/2015 | Kirti ................... | H04L 63/1416 |
| | | | 726/1 |
| 2018/0004942 A1 | 1/2018 | Martin et al. | |
| 2019/0260794 A1* | 8/2019 | Woodford ............... | G06F 40/40 |
| 2019/0394225 A1 | 12/2019 | Vajipayajula et al. | |
| 2020/0128047 A1 | 4/2020 | Biswas et al. | |
| 2020/0327223 A1 | 10/2020 | Sanchez et al. | |
| 2021/0203684 A1 | 7/2021 | Maor et al. | |
| 2021/0218770 A1* | 7/2021 | Ben-Yosef ............ | G06F 21/554 |
| 2021/0234889 A1* | 7/2021 | Burle ................. | H04L 63/1433 |
| 2022/0232040 A1 | 7/2022 | Crabtree et al. | |
| 2023/0088034 A1* | 3/2023 | Salman ................. | H04L 63/205 |
| | | | 726/1 |
| 2023/0102103 A1* | 3/2023 | Mazumder ............... | G06N 7/01 |
| | | | 726/23 |
| 2023/0179623 A1* | 6/2023 | Moolchandani .... | H04L 63/1433 |
| | | | 726/23 |
| 2023/0208870 A1 | 6/2023 | Yellapragada et al. | |

* cited by examiner

Event Data

200

> 2 493062987015 eni-30076669 107.170.242.27 172.31.8.238 123 123 17 1 76 1433806982 1433807038 ACCEPT OK > 2 493062987015 eni-30076669 172.31.8.238 107.170.242.27 123 123 17 1 76 1433806982 1433807038 ACCEPT OK > 2 493062987015 eni-30076669 79.33.7.58 172.31.8.238 54517 23 6 3 180 1433807174 1433807218 REJECT OK > 2 493062987015 eni-30076669 71.6.135.131 172.31.8.238 15314 21379 6 1 40 1433807224 1433807278 REJECT OK > 2 493062987015 eni-30076669 172.31.8.238 108.61.56.35 123 123 17 1 76 1433807281 1433807338 ACCEPT OK > 2 493062987015 eni-30076669 108.61.56.35 172.31.8.238 123 123 17 1 76 1433807281 1433807338 ACCEPT OK > 2 493062987015 eni-30076669 172.31.8.238 23.226.142.216 123 123 17 1 76 1433807350 1433807398 ACCEPT OK > 2 493062987015 eni-30076669 188.138.1.218 172.31.8.238 40082 26 6 1 40 1433807350 1433807398 REJECT OK

300

{"Records": [{
    "eventVersion": "1.0",
    "userIdentity": {
        "type": "IAMUser",
        "principalId": "EX_PRINCIPAL_ID",
        "arn": "arn:aws:iam::123456789012:user/Alice",
        "accountId": "123456789012",
        "accessKeyId": "EXAMPLE_KEY_ID",
        "userName": "Alice"
    },
    "eventTime": "2014-03-24T21:11:59Z",
    "eventSource": "iam.amazonaws.com",
    "eventName": "CreateUser",
    "awsRegion": "us-east-2",
    "sourceIPAddress": "127.0.0.1",
    "userAgent": "aws-cli/1.3.2 Python/2.7.5 Windows/7",
    "requestParameters": {"userName": "Bob"},
    "responseElements": {"user": {
        "createDate": "Mar 24, 2014 9:11:59 PM",
        "userName": "Bob",
        "arn": "arn:aws:iam::123456789012:user/Bob",
        "path": "/",
        "userId": "EXAMPLEUSERID"
    }}
}]}

```
{"Records": [{
    "eventVersion": "1.0",
    "userIdentity": {
        "type": "IAMUser",
        "principalId": "EX_PRINCIPAL_ID",
        "arn": "arn:aws:iam::123456789012:user/Alice",
        "accountId": "123456789012",
        "accessKeyId": "EXAMPLE_KEY_ID",
        "userName": "Alice",
        "sessionContext": {"attributes": {
            "mfaAuthenticated": "false",
            "creationDate": "2014-03-25T18:45:11Z"
        }}
    },
    "eventTime": "2014-03-25T21:08:14Z",
    "eventSource": "iam.amazonaws.com",
    "eventName": "AddUserToGroup",
    "awsRegion": "us-east-2",
    "sourceIPAddress": "127.0.0.1",
    "userAgent": "AWSConsole",
    "requestParameters": {
        "userName": "Bob",
        "groupName": "admin"
    },
    "responseElements": null
}]}
```

START

S810

DETECT A PLURALITY OF EVENTS IN CLOUD LOG

800

S820

EXTRACT IDENTIFIER OF WORKLOAD FROM EVENT MATCHING PREDETERMINED SUSPICIOUS ACTION

S830

DETECT NODE CORRESPONDING TO WORKLOAD IN SECURITY GRAPH

S840

DETECT CYBERSECURITY ISSUE NODE CONNECTED TO WORKLOAD NODE

S850

INITIATE MITIGATION ACTION

END

TECHNIQUES FOR FORENSIC TRACING OF SUSPICIOUS ACTIVITY FROM CLOUD COMPUTING LOGS

CROSS-REFERENCE TO RELATED APPLICATIONS

This application claims the benefit of U.S. Provisional Application No. 63/267,365 filed on Jan. 31, 2022, the contents of which are hereby incorporated by reference.

TECHNICAL FIELD

The present disclosure relates generally to cloud computing, and more specifically to performing forensic analysis in a cloud computing environment.

BACKGROUND

Cloud computing technologies have allowed to abstract away hardware considerations in a technology stack. For example, computing environments such as Amazon® Web Services (AWS), or Google Cloud Platform (GCP) allow a user to implement a wide variety of software and provide the relevant hardware, with the user only paying for what they need. This shared provisioning has allowed resources to be better utilized, both for the owners of the resources, and for those who wish to execute software applications and services which require those resources.

This technology however does not come without its disadvantages. As the computing environment is now physically outside of an organization, and exposed in terms of access to and from the computing environment, vulnerabilities may be more likely to occur.

While many solutions exist which attempt to block cyber-attacks, the reality is that at least some of these attacks will inevitably be successful. An attack may be, for example, unauthorized access to sensitive information, such as information stored in a database. Attacks can be categorized based on severity, for example an attack that merely allows the attacker to see that a file exists on a workload is probably less severe than an attack which allows the attacker to view, or download, that same file.

Digital forensics, or cybersecurity forensics, is a field of art which includes actions that attempt to identify what an attacker was able to accomplish in a computing environment which was attacked. Typically, an individual who has knowledge of the computing environment will manually examine workloads to attempt to discover the extent of damage performed by an attacker, if at all such damage exists. This process requires specialized knowledge which is not easily transferable, and is labor intensive in terms of human hours.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for tracing suspicious activity to a workload based on a forensic log. The method comprises: detecting in at least one cloud log of a cloud computing environment a plurality of events, each event indicating an action in the cloud computing environment; extracting from an event of the plurality of events an identifier of a cloud entity, wherein the event includes an action which is predetermined as indicative of a suspicious event; traversing a security graph to detect a node representing the cloud entity, wherein the security graph further includes a representation of the cloud computing environment; detecting that the node representing the cloud entity is connected to a node representing a cybersecurity vulnerability; and initiating a mitigation action for the cloud entity based on the cybersecurity vulnerability.

Certain embodiments disclosed herein also include a non-transitory computer readable medium having stored thereon causing a processing circuitry to execute a process, the process comprising: detecting in at least one cloud log of a cloud computing environment a plurality of events, each event indicating an action in the cloud computing environment; extracting from an event of the plurality of events an identifier of a cloud entity, wherein the event includes an action which is predetermined as indicative of a suspicious event; traversing a security graph to detect a node representing the cloud entity, wherein the security graph further includes a representation of the cloud computing environment; detecting that the node representing the cloud entity is connected to a node representing a cybersecurity vulnerability; and initiating a mitigation action for the cloud entity based on the cybersecurity vulnerability.

Certain embodiments disclosed herein also include a system for tracing suspicious activity to a workload based on a forensic log. The system comprises: a processing circuitry; and a memory, the memory containing instructions that, when executed by the processing circuitry, configure the system to: detect in at least one cloud log of a cloud computing environment a plurality of events, each event indicating an action in the cloud computing environment; extract from an event of the plurality of events an identifier of a cloud entity, wherein the event includes an action which is predetermined as indicative of a suspicious event; traverse a security graph to detect a node representing the cloud entity, wherein the security graph further includes a representation of the cloud computing environment; detect that the node representing the cloud entity is connected to a node representing a cybersecurity vulnerability; and initiate a mitigation action for the cloud entity based on the cybersecurity vulnerability.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 3 is a role log of a cloud based computing environment, in accordance with an embodiment.

FIG. 4 is another role log of a cloud based computing environment, in accordance with an embodiment.

DETAILED DESCRIPTION

Figure 1:
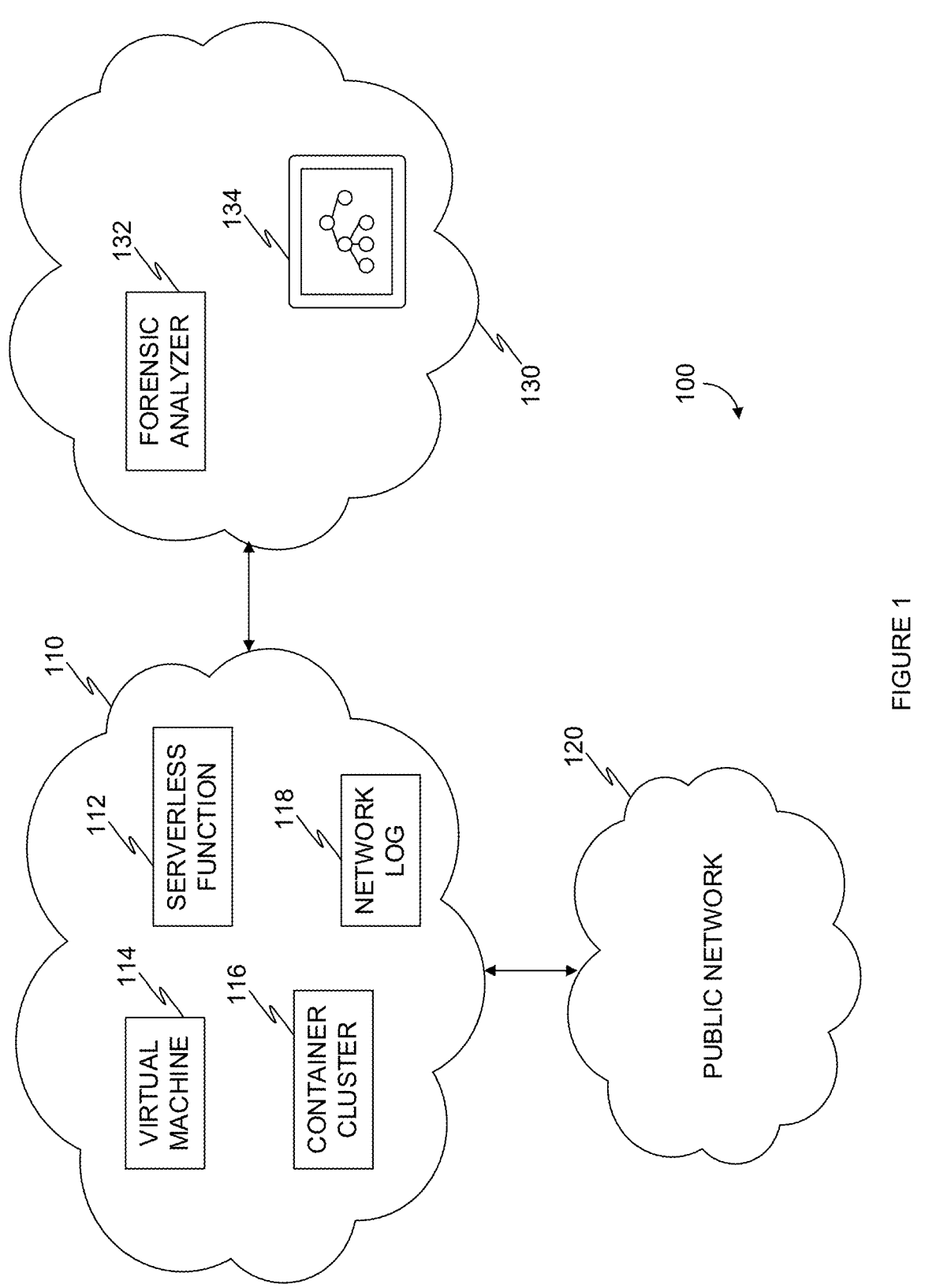
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for tracing suspicious events to workloads in a cloud computing environment based on utilizing a cloud log and a security graph. In an embodiment, a cloud log is searched to detect an event which matches a predetermined suspicious event. In some embodiments, a plurality of events are individually non-suspicious events, however when occurring within a predetermined timeframe the plurality of non-suspicious events comprise together a suspicious event.

A suspicious event includes a record extracted from the cloud log, according to an embodiment. A record includes data describing an event, such as communication between workloads in the cloud computing environment, initiation of an action by a principal, and the like. For example, communication between workloads includes, in an embodiment, a source identifier, a destination identifier, a number of packets transmitted, and the like.

In an embodiment, the system is configured to extract from a record of a suspicious event an identifier of a workload. A query is generated for a security graph based on the identifier, to detect in the security graph a node representing the workload. In an embodiment the security graph includes a representation of the cloud computing environment. The security graph is traversed to detect additional nodes connected to a node representing the workload. For example, the node representing the workload is connected, in an embodiment, to a node representing a cybersecurity issue, a node representing a secret, and the like. A node representing a workload is connected to a node representing a cybersecurity issue to indicate that the workload includes the cybersecurity issue.

In certain embodiments, a mitigation action is initiated in response to detecting the suspicious event on a workload which has a cybersecurity issue. In an embodiment, the mitigation action is initiated in response to detecting that the cybersecurity issue node is connected to the workload node. This indicates that the workload has a cybersecurity issue, and based on the event detected in the cloud log, the cybersecurity issue has been exploited.

It is recognized in this regard that a human can search through digital records to detect suspicious events, and in fact this is how certain forensic approaches are carried out. However, such solutions are often carried out as a response to a previously recognized or suspected cybersecurity breach. This is due to the fact that cloud logs include a tremendous amount of records, sometimes terabytes, or event petabytes in size. For a human operator, to constantly review such a log is impossible, and even if it were possible, is impractical due to the time constraints when performing cybersecurity mitigation.

By the time a human has sifted through petabytes of data, any damage caused by a breach will have already been done. Additionally, suspicious events are not always isolated to a single record, action, and the like, in a cloud computing environment. Often an event becomes suspicious when a plurality of actions are initiated in temporal proximity to each other, and where hundreds and thousands of records are generated each second, it is not practical or possible for a human to consistently apply objective criteria to determine what constitutes a suspicious event based on a plurality of actions in a cloud environment.

FIG. 1 shows an example network diagram 100 utilized to describe the various disclosed embodiments. In the example network diagram 100, two cloud environments are shown for simplicity, though it should be readily apparent that different configurations may be utilized without departing from the scope of this disclosure.

A production environment 110 is implemented in a first cloud computing environment. The first cloud computing environment is deployed on a cloud computing infrastructure in an embodiment, for example, Amazon® Web Services (AWS), Google® Cloud Platform (GCP), Microsoft® Azure, and the like.

The production environment 110 is implemented as a virtual private cloud (VPC), Virtual Network (VNet), and the like, according to an embodiment. A production environment 110 is a cloud computing environment which is utilized as a computing environment from which an organization operates, provides services, and the like. An organization may utilize multiple such cloud computing environments (e.g., an AWS environment, an Azure environment, etc.). In certain embodiments a production environment 110 has a corresponding a staging environment, which in an embodiment is substantially identical to the production environment 110, but is used for testing purposes in order to test services, workloads, policies, and the like, before implementing them in a production environment.

The production environment 110 includes a plurality of cloud entities. In an embodiment, a cloud entity is a resource, a principal, and the like. A resource is a cloud entity which is configured to perform an action in the cloud computing environment, provide access to a service, provide access to a hardware resource, a combination thereof, and the like. For example, in an embodiment, a resource is a workload, such as a serverless function 112, a virtual machine 114, and a container cluster 116. The production environment 110 includes a plurality of each of a different resource type, in some embodiments.

In an embodiment a serverless function 112 is, for example, Amazon® Lambda. A virtual machine 114 is, for example, Oracle® VirtualBox, according to an embodiment. In some embodiments a container cluster 116 is implemented utilizing a Kubernetes® Engine, a Docker® Engine, and the like.

In an embodiment the production environment 110 further includes principals (not shown). A principal is a cloud entity which is authorized to perform actions on a resource, initiate an action in a cloud computing environment, a combination thereof, and the like. In some embodiments a resource is also a principal, for example when operating on another resource.

In an embodiment a principal is, for example, a user account, a service account, a role, and the like. In certain embodiments a workload in the production environment 110 generates activity which is logged in a network log 118. In an embodiment the network log 118 is implemented as a file that contains events (also known as records), which correspond to actions by one or more applications. Events may be, for example, user calls to objects, process calls to objects, authentication attempts, and the like. An example network log is discussed in more detail in FIG. 2 below.

In an embodiment, a network log 118 is a type of cloud log. In some embodiments the network log 118 is generated by a service executed by, for example, the serverless function 112. In an embodiment, the service is configured to monitor a workload in the production environment 110 and write events to the network log 118. In some embodiments, the service is configured to write events to the network log 118 based on a predefined data schema.

In an embodiment, the production environment 110 is communicatively coupled with a public network 120, such as the Internet, and a security environment 130. In an embodiment, the security environment 130 is implemented as a VPC deployed on a cloud computing infrastructure, such as AWS. In an embodiment, the production environment 110 and the security environment 130 are implemented using the same cloud computing infrastructure, different cloud computing infrastructures, combinations thereof, and the like.

In certain embodiments, the security environment 130 includes a forensic analyzer 132, and a security graph 134. The security graph 134 is discussed in more detail with respect to FIG. 3 below, which is an example of a portion of a security graph. In an embodiment, the security graph 134 is implemented on a graph database, such as Neo4j®. In certain embodiments, the security graph 134 includes a representation of a production environment 110. For example, principals, resources, and the like, are represented as nodes on the security graph 134. In some embodiments, the security graph 134 further includes enrichment nodes, such as a node indicating a vulnerability, a node indicating access to a public network, and the like.

In an embodiment, the security environment 130 further includes a plurality of inspectors (not shown). In some embodiments, each inspector is configured to detect a cybersecurity object. For example, a cybersecurity object is, in an embodiment, a secret, a weak password, a certificate, a vulnerability, a misconfiguration, an exposure, a malware, a hash file, and the like. In some embodiments the forensic analyzer 132 is implemented as a workload, such as a node in a container cluster.

In an embodiment the forensic analyzer 132 is configured to access cloud logs, network logs, and the like logs generated in a cloud computing environment. Examples of logs are discussed in more detail below. In some embodiments, the forensic analyzer 132 is further configured to access the security graph 134. In an embodiment, providing access to a forensic analyzer 132 includes providing access to a service account associated with the forensic analyzer 132. A service account associated with a workload, such as the forensic analyzer 132 allows the forensic analyzer to assume a role in a cloud computing environment. In an embodiment, permission to access a log, and the like, in a cloud computing environment, is provided to a service account which is associated with the forensic analyzer 132.

In an embodiment the forensic analyzer 132 is configured to generate a forensic report. In some embodiments, the forensic report is based on a cloud log, a network log, the security graph, a combination thereof, and the like. In some embodiments the forensic report includes, for example, portions extracted from a cloud log, a network cloud, and the like, wherein the extracted portions each correspond to a node of the security graph 134. An example of a method for generating a forensic report is described in more detail below with respect to FIG. 4.

Figure 2:
FIG. 2 is a network log of a cloud based computing environment, in accordance with an embodiment.

FIG. 2 is an example of a network log 200 of a cloud-based computing environment, utilized to describe an embodiment. A network log 200 is a type of cloud log that includes, in an embodiment, a plurality of events, each event recorded as a row in the log. In an embodiment, an event includes a plurality of data fields and their values. In certain embodiments a data field is, for example, an account identifier, an interface identifier, a source address, a destination address (for network messages), a port, a protocol, a number of bytes transferred, a number of packets transferred, an action (e.g., accept, reject, etc.), and the like.

FIG. 3 is an example of a role log 300 of a cloud-based computing environment, in accordance with an embodiment. The role log 300 includes events which are associated with user accounts. For example, a first record 310 includes an event by which a new user account was created. The first record 310 includes a plurality of data fields which are unique to the event. For example, the event has an event name 320, which indicates that the event is related to creating a user account, at an event time 322. Other identifiers, such as the username 324 of the created user account are also recorded.

FIG. 4 is another example of a role log 400 of a cloud-based computing environment, in accordance with an embodiment. The role log 400 includes a second record 410, which indicates that a user Alice (of FIG. 3 above) which previously (based on the event time 412) created a user account Bob, added the user account Bob to an Admin group. The event name 420 indicates that the user account 422 was added to an admin group. Adding administrator accounts is not common, and if it is performed through a machine that may include a vulnerability, as explained herein, this may be an indication that the new administrator-level account is in fact an exploitation.

Figure 5:
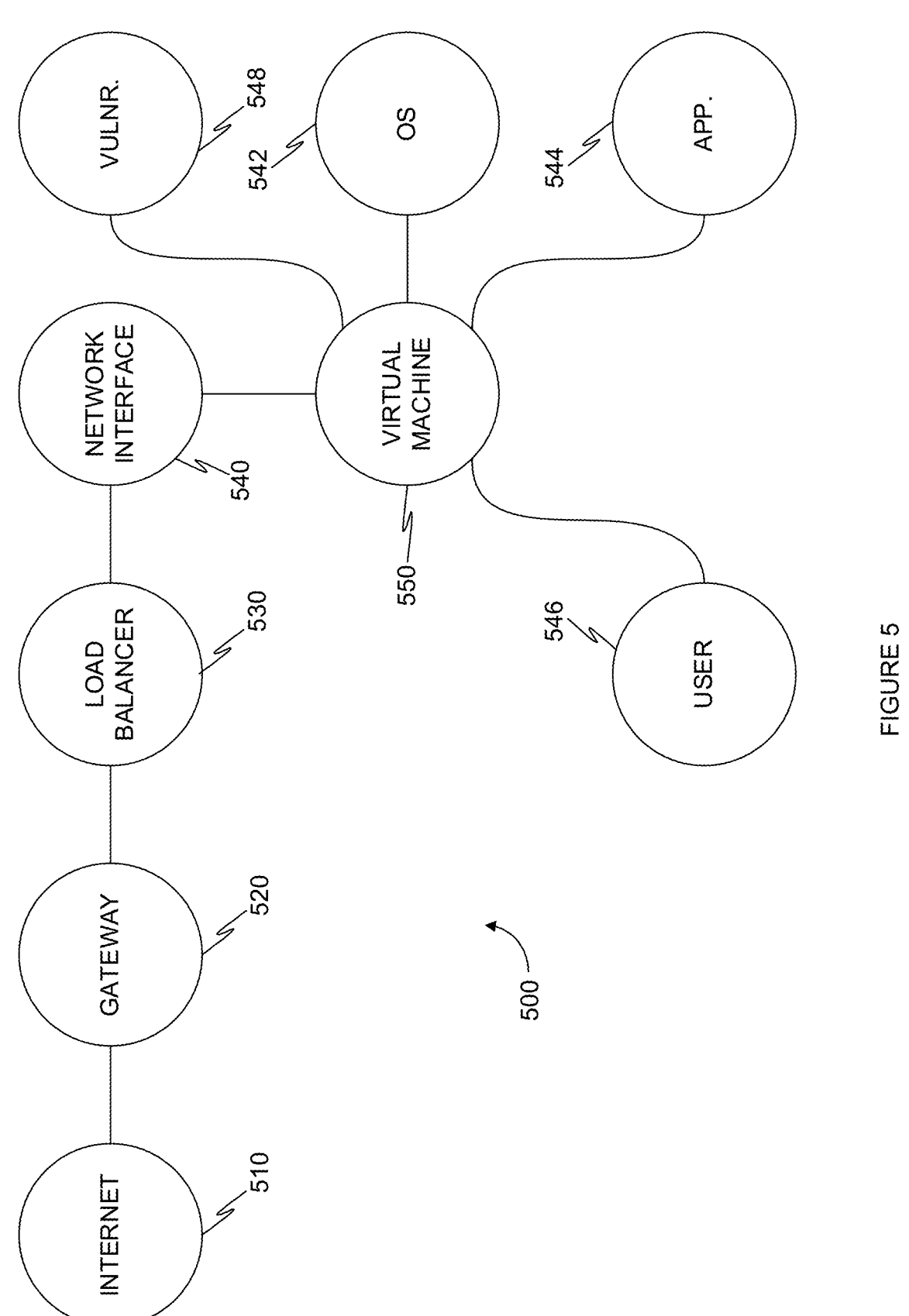
FIG. 5 is security graph, implemented in accordance with an embodiment.

FIG. 5 is an example of a security graph 500, implemented in accordance with an embodiment. A security graph 500 may represent a cloud computing environment, such as the production environment 110 of FIG. 1 above, in a graph database, according to a predefined data schema. A cloud computing environment may be represented in a graph by mapping resources, principals, enrichments, and the like, to nodes in the security graph 500. A resource node may represent a resource, such as a workload. A principal node may represent a user account, service account, role, and the like. An enrichment node may represent an endpoint, such as a public network (e.g., the Internet), a vulnerability, and other attributes of a workload, for example.

An enrichment node 510 represents internet access, such that any node which is connected (e.g., by an edge) to the enrichment node 510, is configured to access the internet. A resource node 520 represents a gateway workload, which may be implemented for example as a node in a container cluster. A second resource node 530 represents a load balancer workload, which is connected by an edge to the resource node 520 representing the gateway, and a network interface node 540. The network interface node 540 is connected to a resource node 550 which represents a virtual machine, such as virtual machine 114 of FIG. 1. The virtual machine 114 may include, for example, an operating system represented by OS node 542, an application which is executed on the OS of the virtual machine, represented by application node 544, a user account node 546 which represents a user account which is tied to the virtual machine 114, and a vulnerability node 548, which represents a vulnerability which was detected as being present on, or pertaining to, the virtual machine 114. A vulnerability may be, for example, an outdated software, a specific open port, a user account with high permissions, and any combination thereof.

Figure 6:
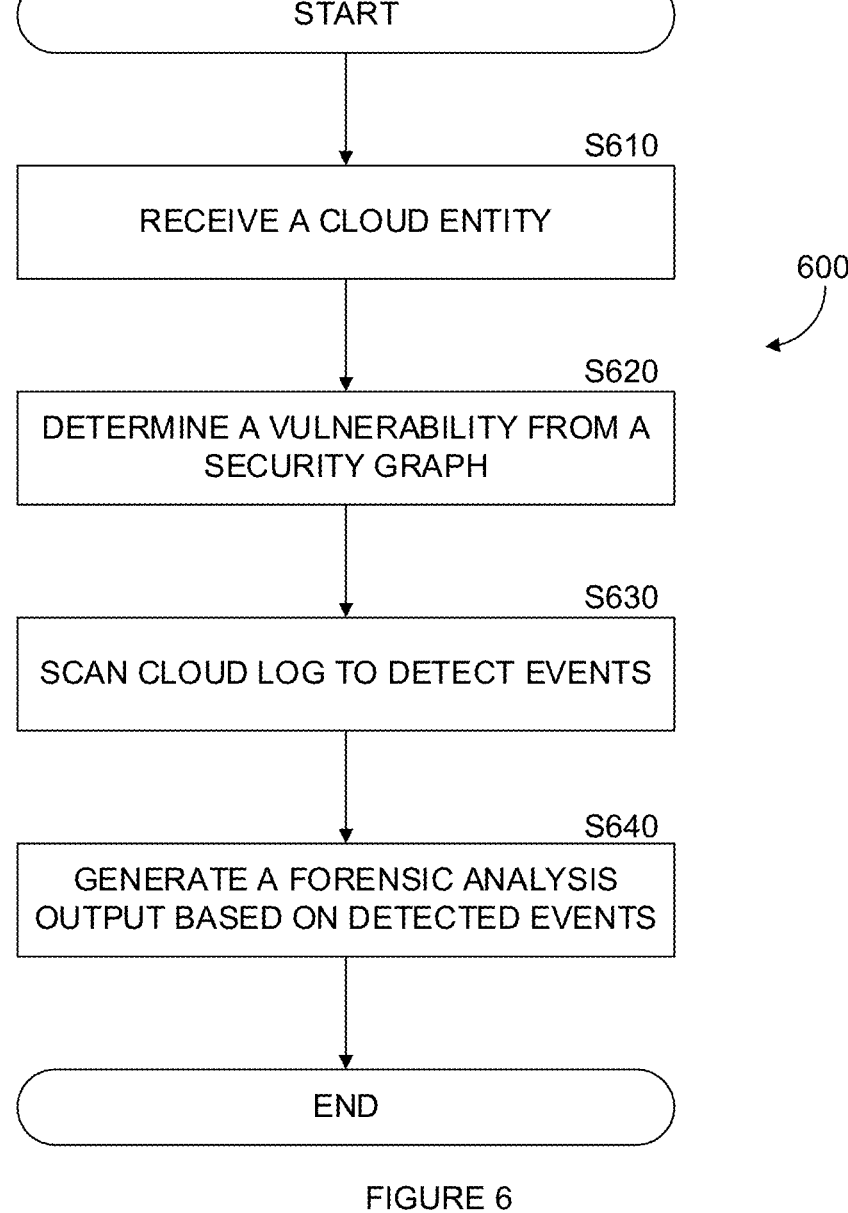
FIG. 6 is a flowchart of a method for generating a forensic analysis report based on a security graph, implemented in accordance with an embodiment.

FIG. 6 is an example flowchart 600 of a method for generating a forensic analysis report based on a security graph, implemented in accordance with an embodiment.

At S610, a cloud entity selection is received. A cloud entity may be, for example, a workload type (e.g., VM, container, serverless function, etc.), an application type (e.g., software application, appliance, OS, gateway, load balancer, etc.), a principal (e.g., user account, service account, etc.), enrichment, vulnerability, and the like. In an embodiment, a cloud entity selection may be received through a user interface. For example, a user may select one or more cloud entities from a predetermined list, and may further select a relationship between the cloud entities. For example, a user may indicate a selection of a virtual machine (workload type) that runs (relationship) a first application (application type) and has (relationship) a user account (principal) with (relationship) certain privileges and is connected to the internet(enrichment).

At S620, a threat is determined for the cloud entity based on the security graph. A threat may be, for example, a vulnerability, misconfiguration, exploitation, and the like. A misconfiguration may be, for example, a database which is not password protected, and should be password protected. For example, a forensic analyzer may receive the cloud entity selection, and query a security graph to detect nodes which match the selected cloud entity. A vulnerability on a workload, for example, is not necessarily exploited, or even exploitable. For example, a workload may have a vulnerability which allows broad access, however if the workload is determined not to be accessible to an external network, then the vulnerability is not exploitable. It is therefore beneficial to reference cloud logs to further detect if a vulnerability was exploited.

At S630, a cloud log is inspected to detect events based on the selected cloud entity and the determined vulnerability. A cloud log may be, for example, a network log, and a role log. In some embodiments, a plurality of cloud logs are inspected. In an embodiment, a forensic analyzer workload is configured to inspect a cloud log, based on data from a security graph. For example, the forensic analyzer 132 workload of FIG. 1 is configured to query a security graph based on a received cloud entity selection, and is further configured to receive a node identifier, node attributes, identifiers of enrichment nodes connected to the cloud entity, and the like. Node attributes may be data field values, such as unique identifier, IP address, workload type, user account name, authentication status, and the like. The forensic analyzer may extract from an output received from the security graph values of the data fields, and perform a search on a cloud log for the extracted values. An event is detected when a match is generated between a data field value of the event, and a value extracted from an output of the security graph query.

At S640, a forensic analysis output is generated. The forensic analysis output includes at least a portion of the cloud log, having the detected events. By generating the forensic analysis output, a user can significantly reduce the amount of information they need to sift through in order to determine if a vulnerability resulted in an exploitation of the same. A cloud log may contain, even for a small window of time, a massive amount of information which is time consuming for a human to sift through, in order to find an indication that a vulnerability was exploited. By determining what are relevant events based on the security graph, and only providing the relevant events to the user, the amount of information which the user sifts through is reduced, and therefore it is beneficial.

Figure 7:
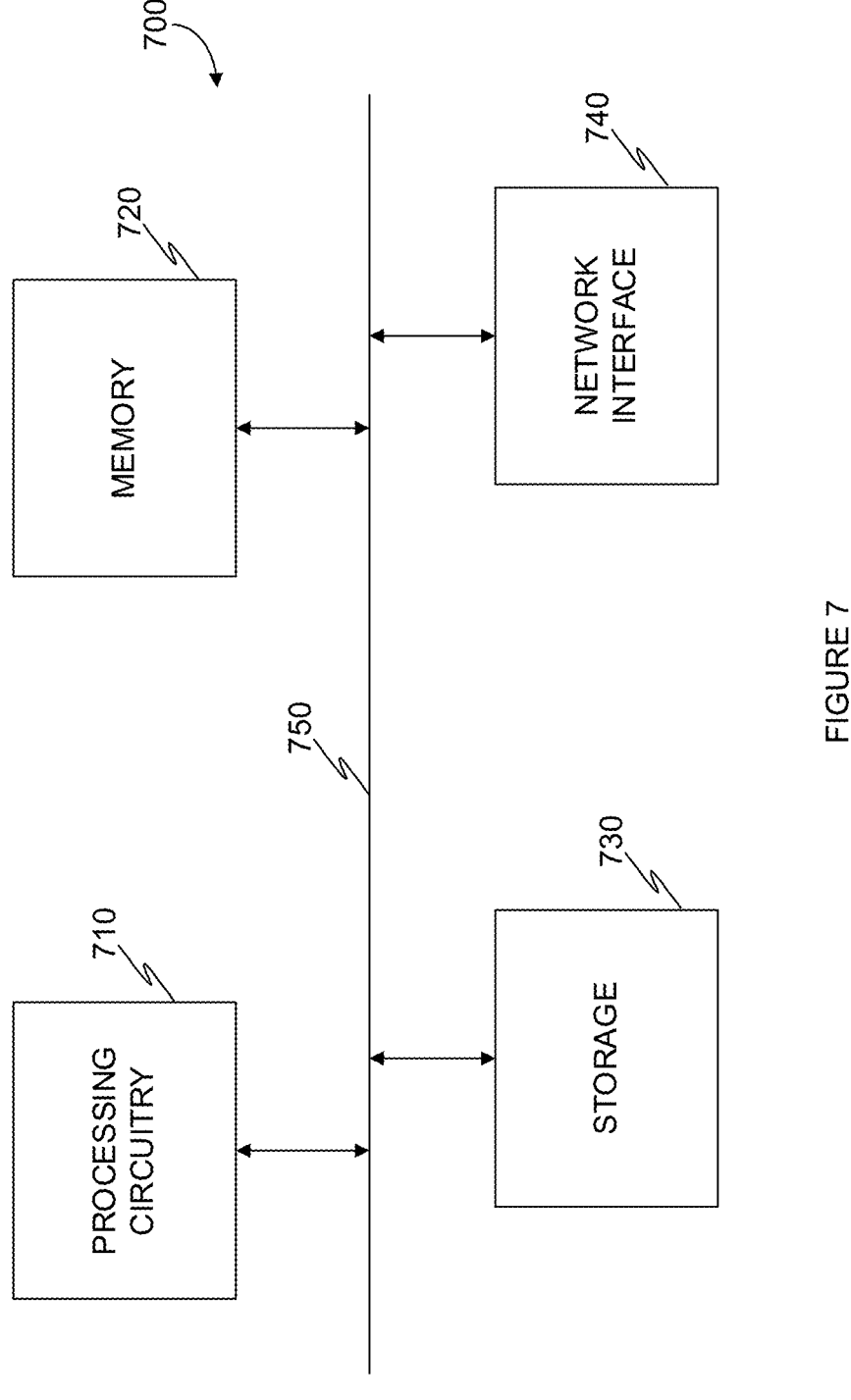
FIG. 7 is a schematic diagram of a forensic analyzer according to an embodiment.

FIG. 7 is an example schematic diagram of a forensic analyzer 700 according to an embodiment. The forensic analyzer 700 includes a processing circuitry 710 coupled to a memory 720, a storage 730, and a network interface 740. In an embodiment, the components of the forensic analyzer 700 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710510, cause the processing circuitry 710 to perform the various processes described herein.

The storage 730 may be magnetic storage, optical storage, and the like, and may be realized, for example, as flash memory or other memory technology, or any other medium which can be used to store the desired information.

The network interface 740 allows the forensic analyzer 700 to communicate with, for example, a security graph, a cloud environment, and the like.

It should be understood that the embodiments described herein are not limited to the specific architecture illustrated in FIG. 7, and other architectures may be equally used without departing from the scope of the disclosed embodiments.

Furthermore, in certain embodiments the [other system] may be implemented with the architecture illustrated in FIG. 7. In other embodiments, other architectures may be equally used without departing from the scope of the disclosed embodiments.

Figure 8:
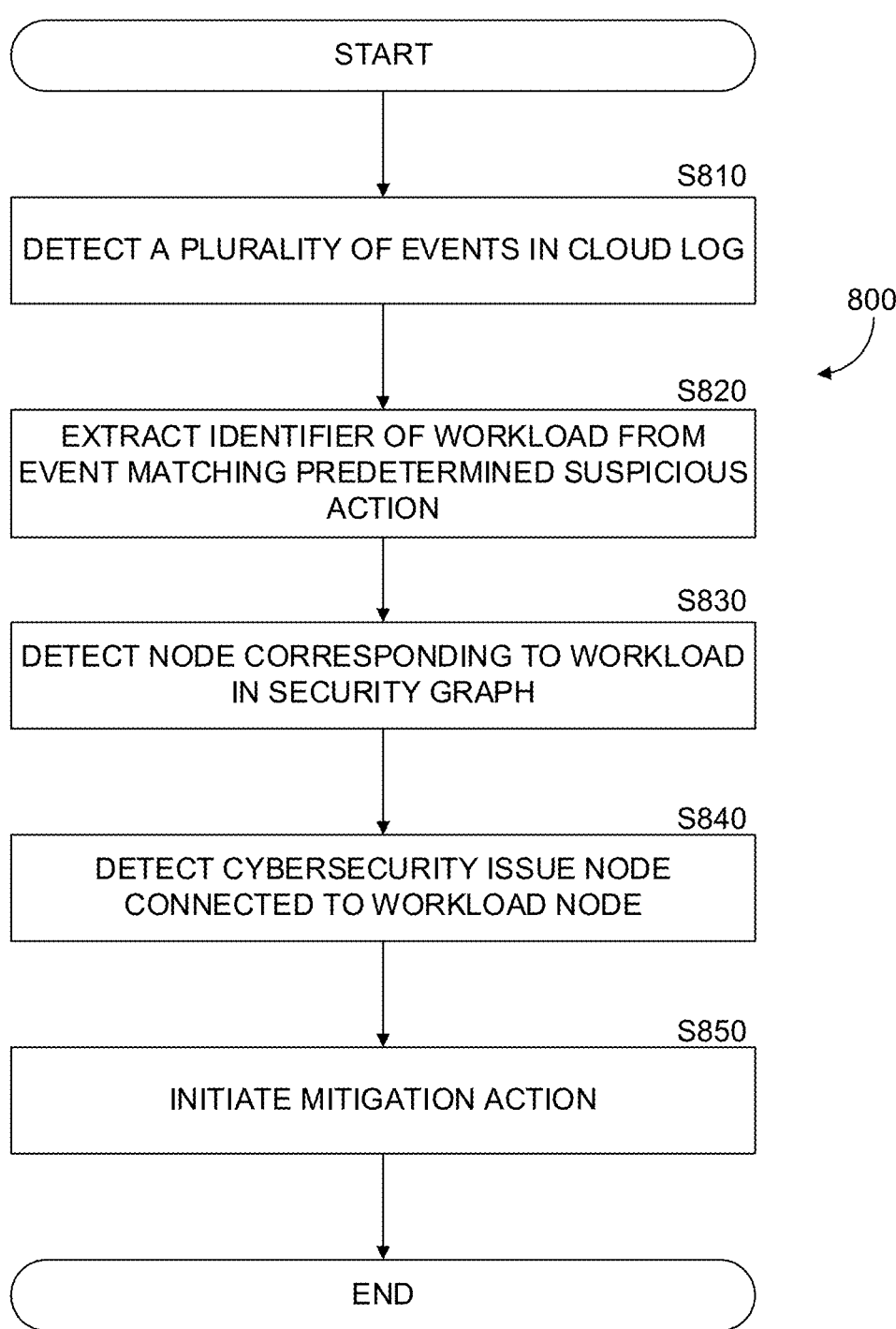
FIG. 8 is a flowchart of a method for tracing suspicious activity to a workload based on a forensic log, implemented in accordance with an embodiment.

FIG. 8 is an example flowchart 800 of a method for tracing suspicious activity to a workload based on a forensic log, implemented in accordance with an embodiment. The embodiments discussed below provide examples of a workload, which is a type of cloud entity in a cloud computing environment. The disclosed method is applied to other cloud entities, such as resources, principals, and the like, according to an embodiment.

At S810, a plurality of events are detected in a cloud log. In an embodiment, the cloud log is a log generated in a cloud computing environment. In certain embodiments, the cloud log includes a plurality of records, each record corresponding to an event. A record is a data structure, which in an embodiment is a predetermined data structure which describes an event. For example, an event is, according to an embodiment, an action initiated in the cloud computing environment, a communication between a first workload and a second workload in the cloud computing environment, a communication between a first workload and an external component (e.g., through a public network such as the Internet), and the like.

In some embodiments, the plurality of events correspond each to a data record that have a common attribute. For example, the common attribute is, in an embodiment, an action type (e.g., assumeRole), a resource identifier, a principal identifier, a workload type (e.g., virtual machine, container node, serverless function, etc.), a principal type (e.g., user account, service account, role, etc.), a network origin address, a network destination address, combinations thereof, and the like.

In certain embodiments, an action initiated in a cloud computing environment. In an embodiment, an action type is predetermined to be a suspicious action. For example, an action type is, according to an embodiment, adding a user account, changing permissions of a user account, assuming a role, deleting a record, deleting a plurality of records, encrypting a record, changing a configuration of a resource, encrypting a database, deploying multiple workloads, deactivating multiple workloads, generating a secret, generating a certificate, generating a key, deleting a secret, deleting a certificate, deleting a key, exposing a resource to a public network, exfiltrating data, planting a malicious entity, initiating a privilege escalation, and the like.

In some embodiments, a suspicious action is an indication of a cybersecurity vulnerability which is being exploited, an attempt is being made to exploit the cybersecurity vulnerability, and the like. For example, where a hacker achieves control of a workload, user account, and the like, a typical attempt will be to increase permissions of the user account (also known as permission escalation). To do this the hacker attempts to initiate actions sequentially to see what works (i.e., what will result in success). By providing early detection of this attack, early mitigation can be performed, thereby reducing the damage of the attack. However, in certain embodiments, these actions are performed routinely. It is therefore desirable to know when these suspicious activities are indicative of a cybersecurity breach, and when they are part of routine activity.

In certain embodiments, a plurality of events are detected, where a first event corresponds to a suspicious action, and a second event corresponds to a non-suspicious action. For example, according to an embodiment the suspicious action is deleting a plurality of records from a database (e.g., where the number of records deleted exceeds a threshold), and the non-suspicious action is an assumeRole of a user account to gain permission to delete records from the database. When taken into account together, these actions are indicative of a cybersecurity breach, where an attacker has gained permission and is causing damage by deleting records.

In some embodiments, a time threshold is utilized to determine if an amount of time elapsed between the suspicious action and the non-suspicious action is within a threshold. In some embodiments, the suspicious action is of a first type, and the non-suspicious action is of a second type.

At S820, an identifier of a workload is extracted from an event corresponding to a suspicious action. In an embodiment, extracting the identifier includes reading a cloud log, extracting an event record, parsing the event record, and detecting a predetermined record attribute. For example, in an embodiment the identifier of a workload is detected by parsing the event record and searching for a term "resourceID".

In some embodiments access to the cloud log is provided prior to reading the cloud log. In certain embodiments, access to the cloud log is granted to a service account associated with a security environment.

At S830, a node is detected in a security graph corresponding to the workload. In an embodiment, the security graph includes a representation of the cloud computing environment in which the workload is deployed. Such a representation and an embodiment thereof is discussed in more detail herein. The node is also referred to as a workload node.

In certain embodiments, detecting a node in the security graph includes generating a query which includes the workload identifier, and executing the query on a database management system of the graph database hosting the security graph. A graph database is, in an embodiment, Neo4j®.

At S840, a cybersecurity issue node is detected. In an embodiment, the cybersecurity issue node represents a cybersecurity issue, such as a misconfiguration, an exposure, a threat, a vulnerability, a weak password, an exposed password, an out-of-date software version, and the like. In certain embodiment, the cybersecurity issue node is connected to the workload node to indicate that the workload includes the cybersecurity issue, is susceptible to the cybersecurity issue, and the like.

By storing a representation in the security graph of a cybersecurity issue and connecting workload nodes representing workloads having the cybersecurity issue to the cybersecurity issue node, a more compact representation is achieved, as rather than store duplicate information for each workload node with respect to the cybersecurity issue, data of the cybersecurity issue is stored only in the cybersecurity issue node, thereby reducing the amount of storage required to store the representation on the graph database.

In an embodiment, the security graph is traversed to detect a node representing a secret connected to the node representing the workload. A secret is, for example, a password, a certificate, a hash, and the like, according to an embodiment. In an embodiment, a node is detected in the security graph representing another workload which is connected to the node representing the secret.

By traversing the security graph to the detect the node representing the another workload, it is possible to detect a potential attack path of an attacker. For example, if the workload is compromised, as indicated by the suspicious event detection, and a secret is present on the workload, the secret is potentially compromised, therefore any other workload, such as the another workload, that utilizes the secret is also potentially compromised.

At S850, a mitigation action is initiated. In an embodiment, the mitigation action is initiated in response to detecting that the cybersecurity issue node is connected to the workload node. This indicates that the workload has a cybersecurity issue, and based on the event detected in the cloud log, the cybersecurity issue has been exploited. In some embodiments, where a suspicious action is followed by a non-suspicious action, the mitigation action includes initiating a mitigation action based on the suspicious action. In other embodiments, where a non-suspicious action is followed by a suspicious action the mitigation action is initiated based on the non-suspicious action. In an embodiment, the suspicious event is tagged as a cybersecurity breach, in response to determining that a workload having a cybersecurity issue is connected to a suspicious event.

For example, according to an embodiment where the successful action is access to a disk by a user account, the mitigating action includes removing access granted to the user account to access the disk.

In some embodiments, the mitigation action includes generating a notification to indicate that the workload is compromised (i.e., the cybersecurity issue is exploited). In certain embodiments, the mitigation action includes updating a severity of an alert to indicate that a workload which is potentially exploitable, has now been verified as exploited. This is advantageous as an alert is generated, in an embodiment, for a workload having a cybersecurity issue, and in certain embodiments the alert further includes a severity alert. However, it is clear that a potential threat is less urgent than a threat which is currently, or has recently been, carried out. It is therefore advantageous to update the severity of an alert (e.g., from medium to critical).

In certain embodiments, the mitigation action is initiated based on a principal, the workload, the cybersecurity issue, a combination thereof, and the like. For example, a mitigation action based on a principal includes, in an embodiment, removing an access, a permission, a role, a combination thereof, and the like, associated with a principal. In some embodiments, the mitigation action includes revoking a permission associated with the workload. For example, a permission is granted to a service account which is associated with the workload, and an instruction is generated to revoke the granted permission from the service account, according to an embodiment.

In an embodiment, the mitigation action includes revoking, altering, and the like, a permission associated with a cloud entity, changing a configuration of a resource, reducing a network exposure of the cloud entity, isolating the cloud entity, blocking network traffic to the cloud entity, blocking network traffic from the cloud entity, a combination thereof, and the like. In an embodiment, isolating a cloud entity includes removing an associated network address from a list of authorized network addresses. In some embodiments, blocking network traffic is performed by a configuring a firewall, a web application firewall (WAF), and the like, to block network traffic to, block network traffic from, and the like, the cloud entity.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:
1. A method for tracing suspicious activity to a workload based on a forensic log, comprising:
    detecting in at least one cloud log of a cloud computing environment a plurality of events, each event indicating an action in the cloud computing environment;
    extracting from an event of the plurality of events an identifier of a first cloud entity, wherein the event includes an action which is predetermined as indicative of a suspicious event;
    traversing an already existing security graph to detect a node representing the first cloud entity, wherein the security graph further includes a representation of the cloud computing environment, the security graph including a node for at least one resource of the cloud computing environment and a node for at least one principal of the cloud computing environment, and further including at least one node representing an enrichment;
    detecting that the node representing the first cloud entity is connected to a node representing a cybersecurity vulnerability;

traversing the security graph to detect a node representing a secret connected to the node representing the first cloud entity;

detecting a node representing a second cloud entity connected to the node representing the secret;

determining that the second cloud entity is compromised; and when the node representing the first cloud entity is connected to the node representing the cybersecurity vulnerability, initiating a mitigation action for the second cloud entity based on the cybersecurity vulnerability.

2. The method of claim 1, wherein the plurality of events are an access event.

3. The method of claim 1, further comprising:

determining that the suspicious event is a cybersecurity breach in response to detecting that the node representing the first cloud entity is connected to the node representing the cybersecurity vulnerability.

4. The method of claim 1, further comprising:

receiving a list of suspicious events, each suspicious event corresponding to an action.

5. The method of claim 4, wherein the action is any one of: deletion of a record, changing a permission of a principal account, changing a configuration of a resource, encrypting a database, deploying multiple workloads, deactivating multiple workloads, generating a secret, generating a certificate, generating a key, deleting a secret, deleting a certificate, deleting a key, exposing a resource to a public network, exfiltrating data, planting a malicious entity, initiating a privilege escalation, encrypting a record, assuming a role, and a combination thereof.

6. The method of claim 1, wherein the secret is any one of: a password, a certificate, a hash, a key, and a combination thereof.

7. The method of claim 1, further comprising:

generating the mitigation action further based on a principal identifier, the principal identifier extracted from the suspicious event.

8. The method of claim 1, wherein the mitigation action includes any one of: revoking a permission associated with the first cloud entity, changing a configuration of a resource, reducing a network exposure of the first cloud entity, isolating the first cloud entity, blocking network traffic to the first cloud entity, blocking network traffic from the first cloud entity, and a combination thereof.

9. A non-transitory computer readable medium having stored thereon instructions for causing a processing circuitry to execute a process for tracing suspicious activity to a workload based on a forensic log, the process comprising:

detecting in at least one cloud log of a cloud computing environment a plurality of events, each event indicating an action in the cloud computing environment;

extracting from an event of the plurality of events an identifier of a first cloud entity, wherein the event includes an action which is predetermined as indicative of a suspicious event;

traversing an already existing security graph to detect a node representing the first cloud entity, wherein the security graph further includes a representation of the cloud computing environment, the security graph including a node for at least one resource of the cloud computing environment and a node for at least one principal of the cloud computing environment and, further including at least one node representing an enrichment;

detecting that the node representing the first cloud entity is connected to a node representing a cybersecurity vulnerability;

traversing the security graph to detect a node representing a secret connected to the node representing the first cloud entity;

detecting a node representing a second cloud entity connected to the node representing the secret;

determining that the second cloud entity is compromised, and when the node representing the first cloud entity is connected to the node representing the cybersecurity vulnerability, initiating a mitigation action for the second cloud entity based on the cybersecurity vulnerability.

10. A system for tracing suspicious activity to a workload based on a forensic log, comprising:

a processing circuitry;

and a memory, the memory containing instructions that, when executed by the processing circuitry, configure the system to:

detect in at least one cloud log of a cloud computing environment a plurality of events, each event indicating an action in the cloud computing environment;

extract from an event of the plurality of events an identifier of a first cloud entity, wherein the event includes an action which is predetermined as indicative of a suspicious event;

traverse an already existing security graph to detect a node representing the first cloud entity, wherein the security graph further includes a representation of the cloud computing environment, the security graph including a node for at least one resource of the cloud computing environment and a node for at least one principal of the cloud computing environment, and further including at least one node representing an enrichment;

detect that the node representing the first cloud entity is connected to a node representing a cybersecurity vulnerability;

traverse the security graph to detect a node representing a secret connected to the node representing the first cloud entity;

detect a node representing a second cloud entity connected to the node representing the secret;

determine that the second cloud entity is compromised; and when the node representing the first cloud entity is connected to the node representing the cybersecurity vulnerability, initiate a mitigation action for the second cloud entity based on the cybersecurity vulnerability.

11. The system of claim 10, wherein the plurality of events are an access event.

12. The system of claim 10, wherein the memory contains further instructions which when executed by the processing circuitry further configure the system to:

determine that the suspicious event is a cybersecurity breach in response to detecting that the node representing the first cloud entity is connected to the node representing the cybersecurity vulnerability.

13. The system of claim 10, wherein the memory contains further instructions which when executed by the processing circuitry further configure the system to:

receive a list of suspicious events, each suspicious event corresponding to an action.

14. The system of claim 13, wherein the action is any one of: deletion of a record, changing a permission of a principal account, changing a configuration of a resource, encrypting a database, deploying multiple workloads, deactivating multiple workloads, generating a secret, generating a certificate, generating a key, deleting a secret, deleting a certificate, deleting a key, exposing a resource to a public network, exfiltrating data, planting a malicious entity, initiating a privilege escalation, encrypting a record, assuming a role, and a combination thereof.

15. System of claim 10, wherein the secret is any one of: a password, a certificate, a hash, a key, and a combination thereof.

16. The system of claim 10, wherein the memory contains further instructions which when executed by the processing circuitry further configure the system to:

generate the mitigation action further based on a principal identifier, the principal identifier extracted from the suspicious event.

17. The system of claim 10, wherein the mitigation action includes any one of: revoking a permission associated with the first cloud entity, changing a configuration of a resource, reducing a network exposure of the first cloud entity, isolating the first cloud entity, blocking network traffic to the first cloud entity, blocking network traffic from the first cloud entity, and a combination thereof.

18. The method of claim 1, wherein at least two events of the plurality of events are individually non-suspicious events, but when the at least two events occur within a predetermined time period, a respective action of each of the at least two events are treated as indicative of a suspicious event.

\* \* \* \* \*